United States Patent
Engeli et al.

(10) Patent No.: US 8,174,616 B2
(45) Date of Patent: May 8, 2012

(54) METHOD AND APPARATUS FOR TRANSITIONING FROM A FIRST DISPLAY FORMAT TO A SECOND DISPLAY FORMAT

(75) Inventors: Severin Werner Engeli, Herisau (CH); Roger Dominik Bozzini, Schaffhausen (CH); Magdy Megeid, Zurich (CH)

(73) Assignee: Thomson Licensing, Boulogne Billancourt (FR)

( * ) Notice: Subject to any disclaimer, the term of this patent is extended or adjusted under 35 U.S.C. 154(b) by 351 days.

(21) Appl. No.: 12/451,624

(22) PCT Filed: Jun. 21, 2007

(86) PCT No.: PCT/IB2007/001672
§ 371 (c)(1),
(2), (4) Date: Nov. 20, 2009

(87) PCT Pub. No.: WO2008/155601
PCT Pub. Date: Dec. 24, 2008

(65) Prior Publication Data
US 2010/0134633 A1     Jun. 3, 2010

(51) Int. Cl.
*H04N 5/46*     (2006.01)
*H04N 7/01*     (2006.01)

(52) U.S. Cl. ............... 348/556; 348/558; 348/445

(58) Field of Classification Search .......... 348/554–556, 348/558, 913, 441, 445, 458, 459; *H04N 7/01, H04N 5/46, 3/27*
See application file for complete search history.

(56) References Cited

U.S. PATENT DOCUMENTS
| | | | |
|---|---|---|---|
| 6,690,425 B1 * | 2/2004 | Worrell | 348/445 |
| 2006/0061687 A1 * | 3/2006 | Dunton | 348/556 |

FOREIGN PATENT DOCUMENTS
| | | |
|---|---|---|
| EP | 0685142 | 9/1999 |
| GB | 2268025 | 12/1993 |
| JP | 2007150907 | 6/2007 |

OTHER PUBLICATIONS
Search Report dated Feb. 12, 2008.

\* cited by examiner

*Primary Examiner* — Sherrie Hsia
(74) *Attorney, Agent, or Firm* — Robert D. Shedd; Paul P. Kiel

(57) ABSTRACT

A letterbox detector includes a detection module configured to determine aspect ratio changes in an input signal. A transition module is configured to transition between a plurality of display modes associated with the aspect ratio changes. A first display mode to a second display mode transition is performed over a first period of time, and a second display mode to a first display mode is performed gradually over a second period of time, that is different from the first period of time. The letterbox detector may be included in digital and analog displays.

14 Claims, 4 Drawing Sheets

METHOD AND APPARATUS FOR TRANSITIONING FROM A FIRST DISPLAY FORMAT TO A SECOND DISPLAY FORMAT

This application claims the benefit, under 35 U.S.C. §365 of International Application PCT/IB2007/001672, filed Jun. 21, 2007 which was published in accordance with PCT Article 21(2) on Dec. 24, 2008 in English.

TECHNICAL FIELD

The present invention generally relates to display formatting and, more particularly, to systems and methods for detecting and gradually transitioning letterbox pictures to full screen pictures.

BACKGROUND

Display systems may employ a plurality of different formats. The video formats may include different aspect ratios. Video formats, with aspect ratios of e.g., 4:3, 16:9, 2:35:1, etc. are in use for broadcasting and/or for video storage mediums. The broadcast or video storage medium format is not necessarily the same as the display format. If no indication information (aspect ratio flags, e.g., wide screen signaling (WSS), etc.) is delivered with the video signal from the source, real-time analysis of the video content is necessary to find black bars if present.

While watching a program from a television (TV) station, many changes of the aspect ratio may occur. For example, advertisements may be broadcasted as 4:3 and/or as a letterbox picture, while a movie may be broadcasted as a letterbox picture.

Because of the nature of the live signal, typically letterbox detectors are only able to react after some time (normally 1-5 seconds) of analysis. As a result, switching from non-letterbox mode to letterbox mode and back always takes time and is delayed. All letterbox detectors which are based on active picture analysis are affected by this problem. The effect for the viewer is jumping/jittering pictures from time to time because this can happen from one frame to another within the same scene (e.g., width and/or height jumps and perhaps also centering jumps). This unpleasant effect occurs even more often if the detector has problems properly detecting the black bars during overall dark scenes or high complexity scenes (e.g., faulty detections/changes). In addition, all of these methods are more or less sensitive to the brightness, noise, the thickness of black bars on the sides or top of the picture and of course the overall complexity of the scenes.

State of the art letterbox detectors change their picture width and/or height as soon as they detect a change of the aspect ratio of the active video area to fill out the screen without displaying unwanted black bars. Some advanced detectors are even able to find logos and/or subtitle information. Such detectors shift the picture up or down together with expansion of the picture (for example, to cut out logos but, keep subtitles and re-center the picture). This change is not smooth; it is abrupt and therefore is disturbing to the viewer. It may especially be a problem when the detector is subjected to the conditions described above.

Letterbox detectors are widely used in the consumer electronics industry and are commonly implemented in mid-range to high-range color TVs (CTVs). Custom solutions are employed, which may include dedicated functions in well-known integrated circuits (ICs). The efficiency of these functions depends on the complexity of the picture analysis. Simpler stages analyze only the average brightness level for a certain number of lines at the top and bottom of the picture. More advanced stages also provide frequency analysis, noise analysis and are able to exclude some areas within the expected black bars to avoid logos from the broadcast station that can adulterate the result. Another technique is to include the detection of subtitles or news-flash information.

It is inevitable that faulty decisions are produced by these stages from time to time in current letterbox detectors. As a result, the CTV may change the displayed aspect ratio and/or resizes the picture back and forth without a change in the source. This unpleasant effect is clearly visible to the viewer, and represents a degeneration of the picture quality which is internally generated by the CTV set itself and should be at least minimized.

SUMMARY

A letterbox detector includes a detection module configured to determine aspect ratio changes in an input signal. A transition module is configured to transition between a plurality of modes associated with the aspect ratio changes. A first mode to a second mode transition is performed gradually over a first period of time, and a second mode to a first mode is performed gradually over a second period of time which is shorter than the first period of time. The letterbox detector may be included in digital and analog displays.

A digital display device includes a signal processor configured to receive digital video signals and output processed video signals. A letterbox detector is configured to receive the digital video signals, determine active area changes in the digital video signals and provide mode transition information. A scaler is configured to receive the mode transition information and transition an active picture area using the processed video signals in accordance with the mode transition information such that the active picture area is gradually transitioned between a first mode and a second mode by a first period of time and transitioned between a second mode and a first mode by a second period of time that is different from the first period of time. This invention may be implemented in an analog display, wherein control of the aspect ratio is done by controlling the deflection signal.

A method for gradual active area transitions in a display device includes comparing an active area of a picture to a mode set on a display, and if the mode set on the display is different from the determined active area, activating an active area transition from a first mode to a second by a first period of time, and activating an active area transition from a second mode to a first mode by a second period of time that is different from the first period of time.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
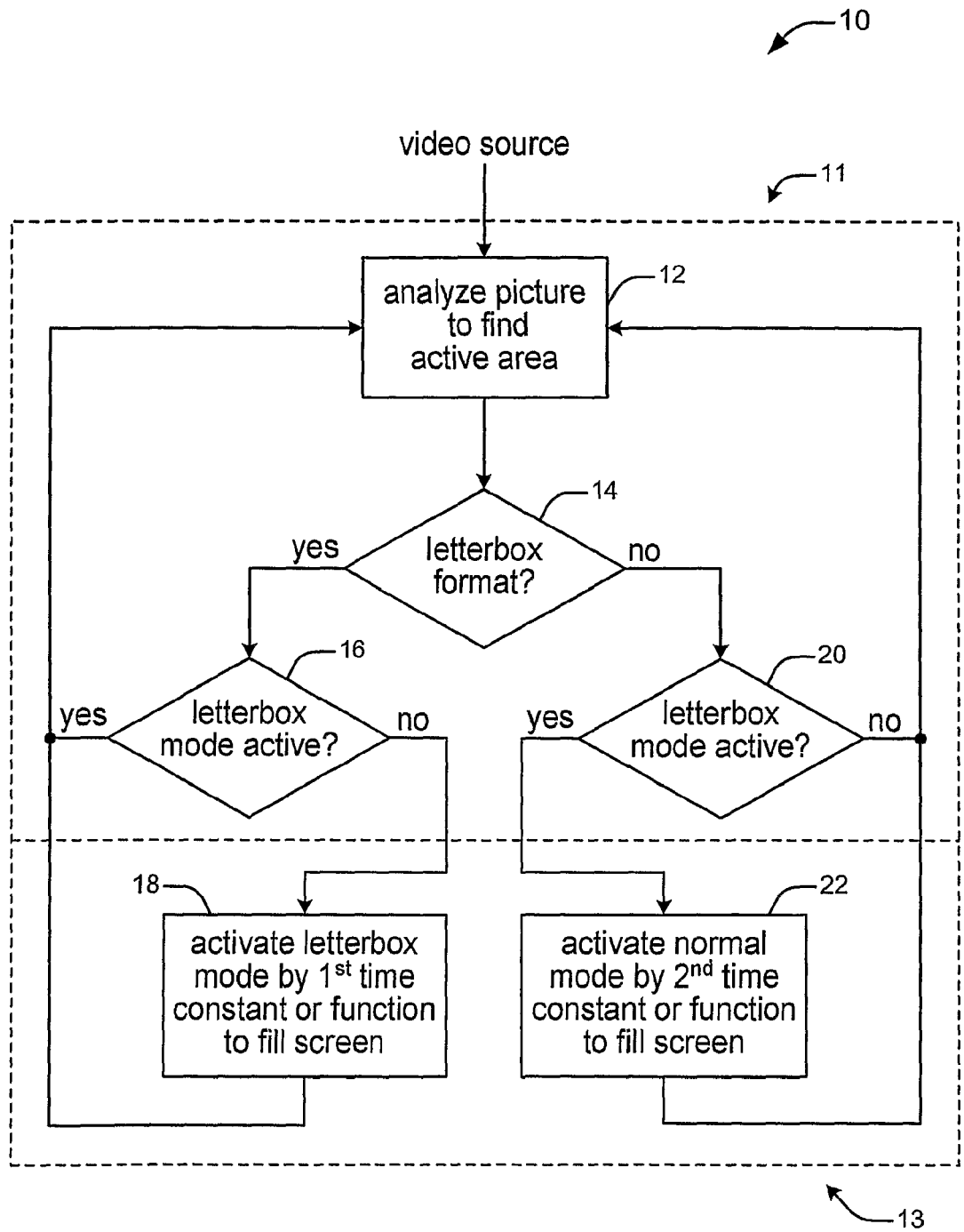
FIG. 1 is block/flow diagram of an exemplary letterbox detector and method for testing an incoming signal and activating/deactivating a successful letterbox detection during real-time analysis.

It should be understood that the drawings are for purposes of illustrating the concepts of the invention and are not necessarily the only possible configuration for illustrating the invention.

DETAILED DESCRIPTION OF THE INVENTION

Embodiments in accordance with the present principles reduce the effect of letterbox picture adjustment to a negligible level for the viewer. In accordance with the present teachings, even for correct aspect ratio changes, it is more convenient for the viewer if a transition occurs smoothly and not from one frame to the other. Changing the aspect ratio and/or the resizing of a letterbox picture to fill the screen without having black bars is advantageously done gradually and not abruptly. In one embodiment, two different time constants are used to achieve gradual transitions without having disturbing effects to the viewer. In accordance with the present disclosure, transition means a non-abrupt change in aspect ratio. Transition as disclosed and described herein does not include a step function or non-continuous function, but a gradual and smooth change between picture areas.

It is to be understood that the present invention is described in terms of television systems; however, the present embodiments are much broader and may include any display type, both digital and analog. In addition, the present embodiments are applicable to any television/display technology including, but not limited to, Plasma, liquid crystal displays (LCD), cathode ray tubes (CRT), projection televisions including DLP, theatre displays, high definition technologies, etc. Embodiments described herein are independent of content source and may receive content over any of a plurality of different networks or broadcasting systems.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. The function of which may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring now in specific detail to the drawings in which like reference numerals identify similar or identical elements throughout the several views, and initially to FIG. 1, an illustrative letterbox detector 10 shows control logic in accordance with one embodiment for testing an incoming video source signal (video source) and activating/deactivating a successful letterbox detection during real-time analysis. The control logic may be implemented in hardware (e.g., a microcontroller, timing unit, etc.), software (logic program, etc.) or a combination thereof). Letterbox detector 10 includes a mode detection module 11 and a transition module 13. Detection module 11 is illustratively described in blocks 12, 14, 16 and 20. The transition module 13 is illustratively described in blocks 18 and 22.

In block 12, an active area of a picture is determined. This may be determined by analyzing the image to determine solid black regions in the image. The result would include a determination of the image window. In block 14, a determination of a letterbox format is made. If the active area is bordered by black regions of a predetermined area, the image is in a letterbox format. In block 16, a determination of whether the letterbox format is active is made. If the letterbox format is active, the flow path returns to block 12 to continue to analyze the video source signal.

If the display device is not in an active letterbox mode in block 16, a letterbox mode is activated to fill the screen with the picture by means of a first time constant or first transition function. Alternately, a transition function may be employed to determine transition time and active area changes. The screen is filled gradually during the first time constant to reduce the negative effects of quick image changes. In block 14, if it is determined that the video source signal is not in letterbox format, the program path goes to block 20. In block 20, a determination is made as to whether a letterbox mode is active. If the letterbox mode is active, a normal mode is activated in block 22 to adjust the screen with letterbox mode picture by means of a second time constant or second transition function. The screen is adjusted gradually during the second time constant to reduce the negative effects of quick image changes. Alternately, a transition function may be employed to determine transition time and active area changes. The transition function may include a linear function, a decaying exponential or any other useful function. Blocks 20 and 22 return to block 12 to continue analyzing the video source.

Figure 2:
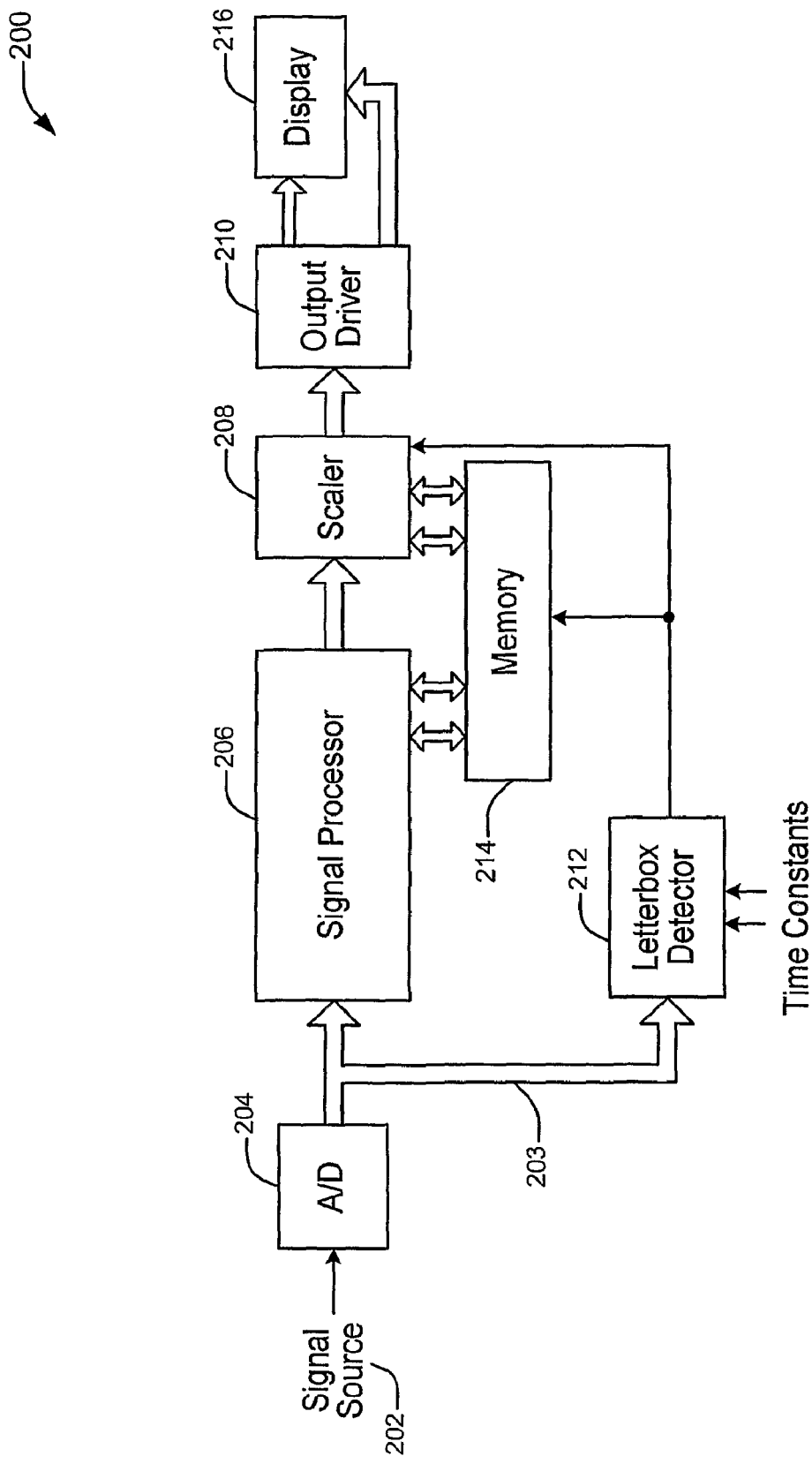
FIG. 2 is a simplified block diagram showing signal processing in a digital CTV system with a matrix display according to one embodiment.

Referring to FIG. 2, a simplified block diagram of an illustrative signal processing circuit in a digital display system 200 with a matrix display 216 is shown in accordance with an exemplary embodiment. System 200 performs the method as depicted in FIG. 1. In system 200, a signal source 202, which may include an analog signal, is input to an analog-digital converter 204. The A/D converter 204 is not needed if signal source 202 is already in digital form. The digital signal 203 is then input to a signal processor 206 for proper formatting for the display device 216. Signal processor 206 may include any a processor chip or software implemented in television sets or display devices.

The digital signal 203 is concurrently sent to a letterbox detector 212 to determine whether the signal source 202 is in a letterbox mode, in a normal mode, or in some other mode such as a zoomed mode. After a determination of mode by the letterbox detector 212, the letterbox detector 212 signals a scaler 208 to adjust the picture output from the signal processor 206 in accordance with the desired mode. However, the transition from one mode to another is controlled such that the transition is gradual. To this end, a memory 214 is provided to store buffered pixel data from the signal processor 206 such that a transition can be carried out in a gradual manner. Letterbox detector 212 includes one, two or more time constants, such that each time constant provides a transition period between modes.

For example, a transition between a letterbox display to a normal display may include a time constant of 2 seconds. During the 2 second period, the letterbox image is transitioned to a normal or full screen picture format using buffered data in memory 214 to gradually fill the screen with each new screen refresh. In another example, a transition between a zoomed display format to a normal display format may include a time constant of, e.g., 1 (10-15 seconds is preferable, although other amounts may be employed) seconds. During the 1 second period, the zoomed image is transitioned to a normal picture format using buffered data in memory 214 to gradually fill the screen with each new screen refresh. The zoomed image may result when a letterbox image is zoomed to fill the display area, but after a certain period, the signal reconverts to a 4 by 3 aspect ratio, for example, during an advertisement. The time constants may be user-selectable for each mode transition or default time transitions may be provided by the manufacturer.

The scaler 208 outputs the transitioning active area for the picture in accordance instructions from the letterbox detector 212 which has the proper transition time constant associated with the desired format. The scaler 208 outputs the image signal to an output driver 210. The output driver 210 provides the pixel signals to be displayed on the display 216 in the proper format including transitioning images during the determined time constant. Time constants may be user-selectable or programmable through a television interface (e.g., using a remote control device). The time constants may be stored in memory 214, stored in letterbox detector 212 or stored within the processor 206.

Existing letterbox detectors may be configured with additional hardware or have existing hardware or software modified to provide the functionality described herein. For example, the letterbox detector 212 may include circuitry or software that may include, e.g., a microcontroller or module and/or a timing-unit, which can be re-programmed to adjust the output of the letterbox detector 212 to provide transitioning in accordance with the time constant(s). In addition, scaler 208 may be adjustable to permit transitioning aspect ratios together with advanced memory timing for memory 214 for digital processed CTVs like LCDs or Plasmas.

A transition from non-letterbox mode to letterbox mode according the invention may take place as follows: The digital data 203 are processed by the signal processor 206 and feed into the memory 214 without cutting unneeded areas of the picture content, for example black bars. If the letterbox detector 212 induces a transition, then the memory read-out of the video signals changes. Instead of reading out the full video content of the incoming signal source 202, the read-out of the video signals is narrowed step-by-step over a first time constant until unwanted black bars disappear from the picture. This may be done by limiting the read address range of the memory 214 compared to the write address range of the memory 214. Gradually transition can be achieved by reducing the read address range with sufficient steps over a given period of time. Scaler 208 processes the reduced output range of data of the memory 214 to fill and fit the display 216.

Figure 3:
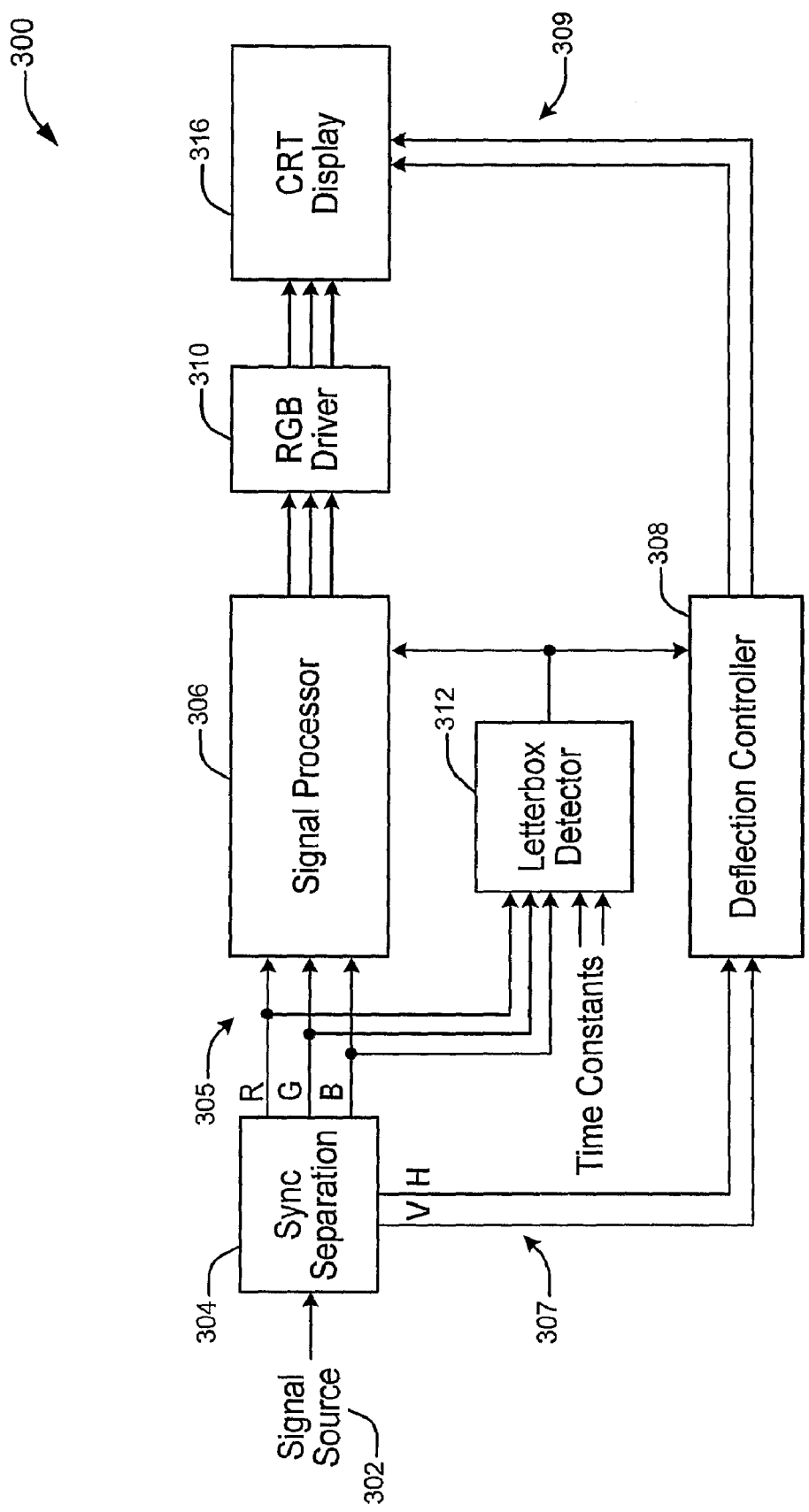
FIG. 3 is a simplified block diagram showing signal processing in an analog CTV system with a CRT display according to another embodiment.

Referring to FIG. 3, a simplified block diagram of an illustrative signal processing flow in an analog display system 300 with a CRT display 316 is shown in accordance with another exemplary embodiment. System 300 performs the method as depicted in FIG. 1. In system 300, a signal source 302 includes an analog signal input to a synch separation device 304. The synch separation device 304 breaks the analog signal into component color signals 305, for example red, green and blue (RGB). The component signals 305 are then processed by signal processor 306 to prepare the signals (e.g., formatting) for display on CRT display 316. Signal processor 306 may include any processor chip or software implemented in television sets or display devices.

The component signal 305 is concurrently sent to a letterbox detector 312 to determine whether the signal source 302 is a letterbox signal source, a non-letterbox signal source, or any other kind of signal source. After a determination of mode by the letterbox detector 312, the letterbox detector 312 signals a deflection controller 308 to adjust the picture output from the synch separation module 304. The synch separation module 304 outputs vertical and horizontal signals 307 which are employed to set up the picture display image. The deflection controller 308 controls the screen parameters to provide the appropriate operation mode and to establish the transition in accordance with the time constants. Deflection circuits including deflection coils (not shown) in display 316 are controlled to adjust the active picture area and transition gradually between modes.

The transition from one mode to another is controlled such that the transition is gradual. To this end, deflection controller 308 adjusts the deflection coil current in proportion with the time constant so that the horizontal and vertical signals 307 are modified from one mode to another such that transition can be carried out in a gradual manner. In analog CTVs, the deflection controller 312 provides sufficient scalability which may already be built-in. However, the deflection controller 308 may be provided with the appropriate scalability to provide transitioning functions as described herein.

Letterbox detector 312 includes one, two or more time constants, such that each time constant is associated with a transition period between any two modes. Once the deflection controller 308 has the proper transition time constant signals associated with the desired format, the deflection controller 308 outputs adjusted deflection coils signals (horizontal and vertical) 309 to display 316. Color component signals output from the signal processor 306 are provided to an RGB driver 310 to provide an electron beam (for each color RGB) for image generation on display 316. The driver 310 provides the signals to electron beam guns (not shown) to display video images on the display 316 in the proper format while transitioning images with the determined time constant.

For example, a transition between a letterbox display format to a normal display format may include a time constant of 2 seconds. During the 2 second period, the letterbox image (which includes hidden but useable active video content) is enlarged to its original size and/or aspect ratio and concurrently the deflection controller 308 re-adjusts the deflection signals 309 with respect to this expansion of the active video area in accordance with a second time constant to gradually fill the screen.

In another example, a transition between a non-normal format, such as a zoomed display, to a normal display format may include a time constant of 1 seconds. During the 1 second period, the normal image (which has unwanted video content like black bars) is cropped according the signal from the letterbox detector 312 over a second time constant and concurrently the deflection controller 308 is adjusted to expand the deflection signals 309 with respect to this reduction of the active video area in accordance with a second time constant to gradually fill the screen.

Implementation in display devices which already have a letterbox detector may be provided using additional hardware/software or modifying of existing hardware/software in most cases. For example, re-programming of a microcontroller in the letterbox detector (312) and/or timing-unit may be performed.

Because the transitions for changing the picture size are relatively slow, no time-critical events are expected, neither hardware- nor software-related. Even the widely used $I^2C$ bus is fast enough to transport, for example, increasing vertical height commands to the deflection controller 308.

Figure 4:
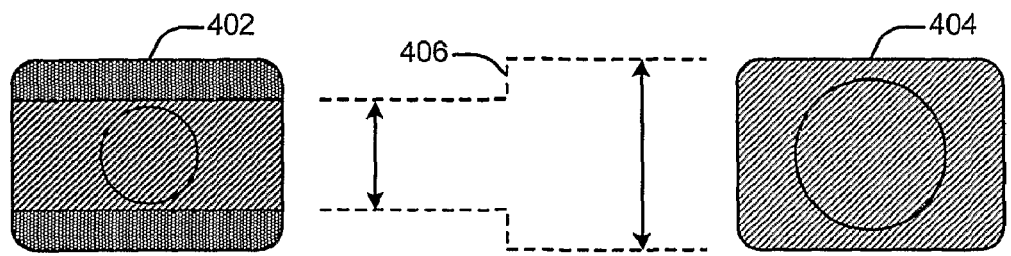
FIG. 4 graphically depicts a change of the aspect ratio after a successful detection of a letterbox signal according to the prior art.

Referring to FIG. 4, a change of the aspect ratio after a successful detection of a letterbox signal 402 is shown according to the prior art. After the letterbox signal 402 is detected, a step change 406 is implemented to provide a normal or full screen operating mode 404. According to the prior art, switching the size of the video signal takes place immediately (no gradual change) to fill the screen after a successful detection. Further, state of the art letterbox detectors change the state in approximately the same time regardless of whether the incoming video content has to be expanded to hide black bars (non-letterbox to letterbox mode) or if the incoming video content has to be refitted to not lose active video content (letterbox mode to non-letterbox mode). The quick or step change 406 is harsh for the viewer, especially if the picture size changes many times over a short period of time.

Figure 5:
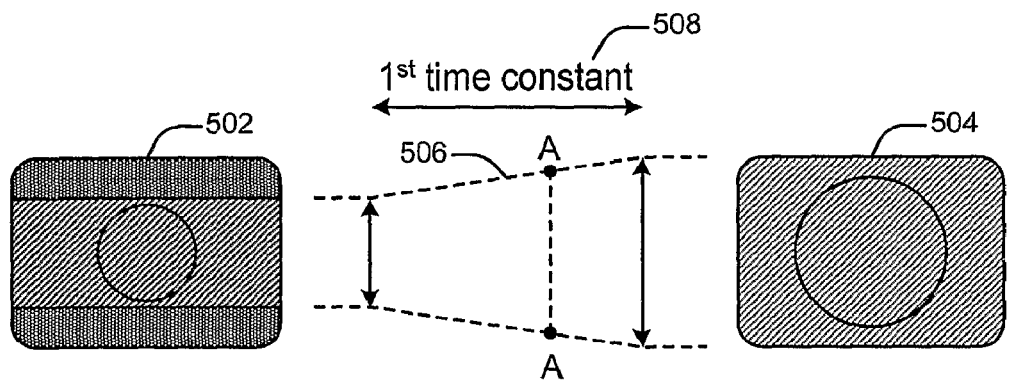
FIG. 5 graphically depicts a charge of aspect ratio after a successful detection of a letterbox signal according to an illustrative embodiment.

Referring to FIG. 5, a change in aspect ratio after a successful detection of a letterbox signal 502 is illustratively shown in accordance with one embodiment. After the letterbox signal 502 is detected, a gradual change 506 is implemented to provide a normal or full screen operating mode 504. The gradual change is implemented over a time constant period 508. A first time constant 508 provides the rate (or slope) of the change 506 such that the change is gradual. The gradual change expands an active area of the picture with according to the first time constant 508 to provide the viewer a smooth transition to the new aspect ratio without having unpleasant effects to the viewer.

Should the image mode change during the transition period 506, the transition for the new scene would preferably begin at the latest active area size. For example, during a transition from letterbox picture 502 to normal picture 504 (e.g., at point A-A), the format changes back to letterbox. According to one embodiment, the active area of the picture preferably starts from point A-A and returns to the letterbox image format 502.

Figure 6:
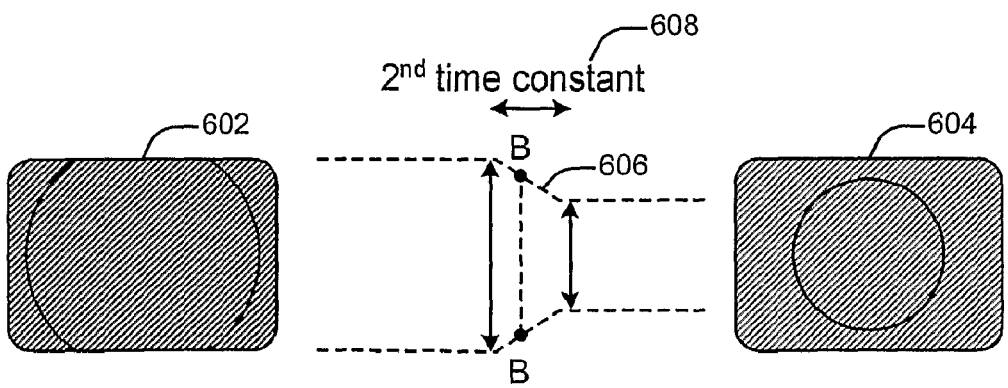
FIG. 6 graphically depicts a change of aspect ratio after a successful detection of a non-letterbox signal according to another illustrative embodiment.

Referring to FIG. 6, a change of aspect ratio after a successful detection of a non-letterbox signal 602 is illustratively shown in accordance with another embodiment. After the non-letterbox signal 602 is detected, a gradual change 606 is implemented to provide a normal or full screen operating mode 604. The gradual change is implemented over a second time constant period 608.

The second time constant 608 is used to switch back the aspect ratio of the displayed signal to the full video size on the screen if the source switches back to its original aspect ratio. In one embodiment, the second time constant 608 is less than the first time constant (508, FIG. 5) to prevent the viewer from missing too much of the hidden top and/or bottom areas of the picture. These areas may include useful information for the user (e.g., active video content, captions, news updates, channel information etc.).

The second time constant 608 provides the rate (or slope) of the change 606 such that the change is gradual. Should the image mode change during the transition period 606, the transition for the new scene would preferably begin at the latest active area size. For example, during a transition (at point B-B) from non-letterbox picture 602 to normal picture 604, the format changes back to the non-letterbox. The active area of the picture starts from point B-B and returns to the non-letterbox image format 602. This provides a gradual change for transitioning between any two modes.

It should be understood that the transitions 506 and 606 are depicted in FIGS. 5 and 6 as linear transitions; however, it is contemplated that instead of linear time constants, transitions 506 and 606 may be non-linear or may be implemented based on a function. For example, transitions may be logarithmic, exponential, parabolic, hyperbolic, sinusoidal, or any other function of combination of functions. It is further contemplated that the modes transitioned to and from may include modes other than, letterbox, and normal. For example, the modes may include any mode, such as, custom aspect ratio modes, wide screen modes, zoom modes, etc.

Having described preferred embodiments for a system, apparatus and method for letter-box detector transitions (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularilty required by the patent laws, what is claimed and desired protected by Letters Patent is set forth in the appended claims.

The invention claimed is:

1. A letterbox detector, comprising:
    a detection module configured to determine aspect ratio changes in an input signal; and a transition module configured to transition between a plurality of display modes associated with the aspect ratio changes, wherein a first display mode to a second display mode transition is performed over a first period of time, and the second display mode to the first display mode transition is performed over a second period of time that is different from the first period of time.

2. The letterbox detector as recited in claim 1, wherein the detection module includes a picture analyzer to determine an active area wherein the active area is compared to an active mode of a display device to determine if a transition is needed.

3. The letterbox detector as recited in claim 1, wherein the transition module includes a plurality of time constants, each time constant being associated with a transition between different display modes.

4. The letterbox detector as recited in claim 1, wherein one of the first and second periods of time are determined by a transition function.

5. A digital display device, comprising:
   a signal processor configured to receive digital video signals and output processed video signals;
   a letterbox detector configured to receive the digital video signals, determine active area changes in the digital video signals and provide display mode transition information;
   a scaler configured to receive the display mode transition information and transition an active picture area using the processed video signals in accordance with the display mode transition information such that the active picture area is transitioned between a first display mode and a second display mode by a first period of time and transitioned between the second display mode and the first display mode by a second period of time that is different from the first period of time.

6. The display device as recited in claim 5, further comprising a memory configured to receive the processed video signals and provide the processed video signals to the scaler for output in accordance with the display mode transition information.

7. The display device as recited in claim 5, wherein the letterbox detector includes a plurality of time constants, each time constant being associated with a transition between different display modes.

8. The display device as recited in claim 5, wherein one of the first and second periods of time are determined by a transition function.

9. The display device as recited in claim 5, wherein at least one of the first and second periods of time is user selectable.

10. The display device as recited in claim 5, wherein if during a transition between the first display mode and the second display mode the active picture area changes, the letterbox detector begins a new transition at a last transition position before the change.

11. A method for changing display modes in a display device, comprising:
    comparing an active area of a picture to a display mode set on a display; and
    if the display mode set on the display is different from the determined active area, activating an active area transition from a first display mode to a second display mode by a first period of time; and
    activating an active area transition from the second display mode to the first display mode by a second period of time that is different from the first period of time.

12. The method as recited in claim 11, wherein activating a gradual active area transition includes activating one of a plurality of time constants, each time constant being associated with a transition between different display modes.

13. The method as recited in claim 12, wherein one of the first and second periods of time is determined by a transition function.

14. The method as recited in claim 11, further comprising, if during a transition between the first display mode and the second display mode the active picture area changes, continuing a new transition at a last transition position before the change.

* * * * *